United States Patent [19]

Chiba et al.

[11] Patent Number: 4,500,682
[45] Date of Patent: Feb. 19, 1985

[54] HIGH MELT-VISCOELASTIC POLYPROPYLENE FOR POST-PROCESSED SHEETS AND FOR BLOW MOLDING

[75] Inventors: Hiromasa Chiba; Kenjiro Obama; Shunji Kawazoe; Takahiro Oka; Akihiro Sato, all of Chibaken, Japan

[73] Assignee: Chisso Corporation, Osaka, Japan

[21] Appl. No.: 495,655

[22] Filed: May 18, 1983

[30] Foreign Application Priority Data

May 19, 1982 [JP] Japan ................... 57-84447

[51] Int. Cl.$^3$ .................. C08L 23/12; C08L 23/16
[52] U.S. Cl. .................. 525/240; 525/247; 526/348; 526/351; 526/73
[58] Field of Search .............. 525/240, 247; 526/348, 526/351, 73

[56] References Cited

U.S. PATENT DOCUMENTS

| | | | |
|---|---|---|---|
| 3,954,704 | 5/1976 | Verne et al. | 525/247 |
| 4,291,138 | 9/1981 | Sato et al. | 525/247 |
| 4,301,256 | 11/1981 | Jezl | 525/247 |
| 4,339,557 | 7/1982 | Hasuo et al. | 525/247 |
| 4,365,045 | 12/1982 | Schneider et al. | 525/247 |
| 4,380,608 | 4/1983 | Hasuo et al. | 525/247 |
| 4,414,369 | 11/1983 | Kuroda | 526/65 |

FOREIGN PATENT DOCUMENTS 56-70014  6/1981  Japan .
57-185304 11/1982  Japan .

*Primary Examiner*—Carman J. Seccuro
*Attorney, Agent, or Firm*—Fred Philpitt

[57] ABSTRACT

A polypropylene (PP) having a superior post-processability and blow moldability is provided, which PP is obtained by polymerizing propylene at multiple stages using a catalyst comprising a $TiCl_3$ composition, an organoaluminum compound and a molecular weight (M.W.) modifier, the resulting final polymer comprising a higher M.W. portion and a lower M.W. portion having a melt flow index of 0.03 to 2.0 g/10 min., and between this index and a melt flow index (10.2 kg/10 minutes, 230° C.) as measured under 5 times the load applied in the measurement of the former melt flow index, there being a relationship log HMI $\geq$ 0.922 log MI + 1.44, and the final polymer consisting of 40 to 60 weight % of a PP portion corresponding to the higher M.W. portion and 60 to 40 weight % of a PP portion corresponding to the lower M.W. portion.

4 Claims, No Drawings

HIGH MELT-VISCOELASTIC POLYPROPYLENE FOR POST-PROCESSED SHEETS AND FOR BLOW MOLDING

BACKGROUND OF THE INVENTION

1. Field of the Invention

This invention relates to a high melt-viscoelastic polypropylene for post-processed sheets and for blow molding and a process for producing the same. More particularly it relates to a high melt-viscoelastic polypropylene obtained by polymerizing propylene at multiple stages so that the resulting polypropylene may consist of polymer proportions of two sections having a definite difference between the molecular weights, and also to a process for producing the same.

Further the present invention relates to a polypropylene which is superior in the post-processability for forming sheets (hereinafter referred to as sheet-moldability) as well as to the blow moldability, and also to a process for producing the same. 2. Description of the Prior Art Sheets produced by processing known polypropylene have various drawbacks that at the time of molding by heat for post-processing (or secondary processing), the resulting sheet sags rapidly; the ranges of processing conditions are narrow; the molding efficiency is inferior; sag of wide sheets is large; the thickness of post-processed products is liable to be non-uniform; overlying wrinkles are lible to be formed; etc. Thus, only small-type molded products could have been produced. On the other hand, when known polypropylene is used for blow molding, the following problems are raised:

(1) Since the sag of parison at the time of the molding is large, the thickness of the resulting-molded products is non-uniform and hence blow molding process can be applied only to small-type products; (2) if a higher molecular weight polypropylene is used for preventing the above-mentioned sag, an inferior fluidity, a large amount of charge at the time of the molding, a great loss of energy and mechanical troubles may be caused and also the resulting molded products have a notable surface roughening to lose their commodity value; etc. In order to improve the above-mentioned sheet-moldability and blow moldability of polypropylene, various processes have so far been proposed. For example, Japanese patent publication No. Sho 47-80614/1972 and Japanese patent application laid-open No. Sho 50-8848/1975 disclose a process of blending low density polyethylene or the like with polypropylene. However, molded products produced from such a mixture are liable to cause surface roughening, and in order to prevent it, a powerful kneading is required at the time of melting; thus the process has to be restricted in the aspect of choice of kneaders and power consumption. Further Japanese patent application laid-open No. Sho 56-70014/1981 discloses a two-stage copolymerization process wherein a difference in the molecular weight as well as a difference in the polymer amount are afforded between the polymer portions formed at the respective stages. However, the melt flow characteristics of the copolymer obtained according to the process are insufficient. Furthermore Japanese patent application laid-open No. Sho 55-118906/1980 discloses a process for making definite the relationship between the melt flow ratio and the melt flow rate of polypropylene. In the case of the process, however, the relationship of the melt flow rate with the melt flow characteristics is not taken into consideration, and the swell ratio (SR), too, cannot be primarily determined relative to the extrusion shear rate of polypropylene; hence the process cannot always correspond to the improvement in various processing characteristics relative to the present invention.

The present inventors have made strenuous studies in order to solve the various problems of the above known art relative to the improvement in the sheet-moldability and blow moldability of polypropylene, and as a result have found that the above problems can be solved by polymerizing propylene at multiple stages so that the resulting polymer consists of two sections; adjusting the relationship between the molecular weights of the respective polymer portions corresponding to the two sections, within a definite range; and further preferably adjusting the ratio of the amounts of the respective polymer portions corresponding to the two sections.

As apparent from the above description, an object of the present invention is to provide a polypropylene having a superior sheet-moldability and blow moldability which are deficient in known polypropylene, and a process for producing the same. Another object of the present invention is to extend the application field of polypropylene sheet molded products and blow molded products and make production of molded products of good quality easier.

SUMMARY OF THE INVENTION

The present invention resides in the following two aspects consisting of four items (1)~(4):

(1) A polypropylene for post-processed sheets and for blow molding which is characterized in that 1. said polypropylene is obtained by polymerizing propylene at multiple stages by the use of a catalyst comprising a titanium trichloride composition and an organoaluminum compound and a molecular weight modifier;
2. the resulting final polymer comprising a higher molecular weight portion and a lower molecular weight portion has a melt flow index (MI) of 0.03 to 2.0 g/10 minutes, and between this melt flow index and a melt flow index (HMI) (10.2 kg/10 minutes, 230° C.) as measured under 5 times the load applied in the measurement of the former melt flow index, there is a relationship $$\log HMI \geq 0.922 \log MI + 1.44 \qquad (1); \text{ and}$$

3. said final polymer consists of 40 to 60% by weight of a polypropylene portion corresponding to said higher molecular weight portion and 60 to 40% by weight of a polypropylene portion corresponding to said lower molecular weight portion.

(2) A polypropylene according to the item 1 wherein propylene is copolymerized with ethylene at at least one of said multiple stages and the ethylene content in said final polymer is in the range of 1 to 15% by weight.

(3) A process for producing a polypropylene for post-processed sheets and for blow molding which is characterized in that propylene is polymerized at multiple stages by the use of a catalyst comprising a titanium trichloride composition and an organoaluminum compound and a molecular weight modifier, to obtain a final polymer comprising a higher molecular weight portion and a lower molecular weight portion, this final polymer having a melt flow index (MI)

of 0.03 to 2.0 g/10 minutes, and between this melt flow index and a melt flow index (HMI) (10,2 kg/10 minutes, 230° C.) as measured under 5 times the load applied in the measurement of the former melt flow index, there beging a relationship $$\log \text{HMI} \geq 0.922 \log \text{MI} + 1.44 \quad (1), \text{ and}$$

said final polymer consisting of 40 to 60% by weight of a polypropylene portion corresponding to said higher molecular weight portion and 60 to 40% by weight of a polypropylene portion corresponding to said lower molecular portion.

(4) A process for producing a polypropylene according to the item 3 wherein propylene is copolymerized with ethylene at at least one of said multiple stages and the ethylene content in said final polymer is in the range of 1 to 15% by weight.

DESCRIPTION OF THE PREFERRED EMBODIMENTS

Polypropylene of the present invention is produced as follows:

Propylene is polymerized at at least two stages by the use of the so-called Zeigler-Natta catalyst comprising a titanium trichloride composition, an organoaluminum compound and a molecular weight modifier. As the titanium trichloride composition, there may be a material obtained by reducing TiCl$_4$ with hydrogen, metallic aluminum, an organoaluminum compound or the like, followed by preactivation according to a known method (milling, heat-treatment, treatment with an electron acceptor or an electron donor). As the organoaluminum compound, those expressed by the general formula AlR$_n$X$_{3-n}$ (wherein R represents alkyl, aryl or alkaryl group, $0 < n \leq 3$ and X represents a halogen atom) may be used. As the molecular weight modifier, hydrogen may be used. The polymerization conditions (temperature, pressure and time) may be applied to the polymerization within known ranges. As for the polymerization form, as far as the multistage stage polymerization of the present invention is possible, any known form of bulk polymerization, suspension polymerization and gas phase polymerization may be employed. A simplest two-stage polymerization will be described below. In the present invention, it is preferred that the amount of the first stage polymer portion (A) be nearly equal to that of the second stage polymer portion (B), and concretely the amounts be both in the range of 35 to 65% by weight based on the total weight of (A) and (B), preferably 40 to 60% by weight. If the ratio of the amounts of (A) and (B) exceeds the above-mentioned range, the resulting polypropylene does not have sufficient melt flow properties, the kneading effectiveness at the time of granulation is insufficient and it is not only difficult to finally obtain a homogeneous molded product, but also the extent of improvement in the melt viscoelasticity is small. Further, the difference between the molecular weights of the two polymer portions should be within a range of definite values as described below in an equation (2). As for the polymerization condition therefor, polymerization is carried out by djusting the concentration of gas phase hydrogen. Now, if the intrinsic viscosity (as measured in tetralin solution at 135° C.) of the higher molecular weight portion is $[\eta]_H$ and that of the lower molecular weight portion is $[\eta]_L'$, then these two viscosities should satisfy the following equation:

$$3.0 \leq [\eta]_H - [\eta]_L \leq 6.5 \quad (2)$$

This relationship substantially corresponds to the above-mentioned relationship (1). Namely if $[\eta]_H - [\eta]_L < 3.0$, then log HMI $< 0.922$ log MI $+ 1.44$. Thus the melt flow characteristics of polypropylene at the time of its melting for processing is insufficient and the extent of improvement in the melt viscoelasticity is also insufficient to make it impossible to prevent sag of sheet at the time of its secondary processing. Contrarily if $[\eta]_H - [\eta]_L > 6.5$, then the difference between the molecular weights of the two portions (A) and (B) becomes excessive to enlarge the non-uniformity of the molecular weights of the resulting granulated polypropylene particles, and as a result, molded products produced from such a polypropylene have a much roughened surface.

In the present invention, propylene alone is not only used, but also propylene may be used together with another monomer within a range which is not harmful to satisfaction of the object of the pesent invention. Although such another monomer is not limited, for example, α-olefins such as ethylene, butene-1, hexene-1, 4-methylpentene-1, etc. and vinyl compounds such as styrene, vinylhexane, divinylbenzene, etc. may be illustrated. Such a copolymerization may be carried out with either one of the above-mentioned (A) or (B) or both of (A) and (B). Particularly the method of using ethylene at the same time may be applied to any stage of polymerizations of the present invention, and if the amount of ethylene used during one stage is 50% by weight or less and the ethylene content in the total polymer is in the range of 1 to 15% by weight, preferably 2 to 10% by weight, then it is possible to obtain desirable processing physical properties aimed in the present invention.

The methods for measuring values of physical properties in Examples of the present invention are as follows:

(1) Melt flow index (MI): According to ASTM D-1238. Melt flow index (HMI): A load of 10.2 kg was used according to ASTM D-1238.

(2) Intrinsic viscosity [η]: Measured in tetralin at 135° C. In this measurement, the first stage intrinsic viscosity $[\eta]_1$, the intrinsic viscosity $[\eta]_T$ of the total polymer formed throughout the first stage and the second stage and the proportions by weight a and b of the respective polymer portions formed at the first stage and the second stage were measured and then the second stage intrinsic viscosity $[\eta]_2$ was calculated from the following equation (3):

$$[\eta]_T = a[\eta]_1 + b[\eta]_2 = a[\eta]_1 + (1-a)[\eta]_2 \quad (3)$$

(3) Ethylene content: Measured according to IR method.

EXAMPLE 1 a. Production of polymer:

Into a 50 l capacity, N$_2$-purged polymerization vessel were introduced dry n-hexane (20 l), diethylaluminum monochloride (8 g) and a titanium trichloride composition (a material obtained by reducing TiCl$_4$ with metallic aluminum and mixing and milling the resulting A type titanium trichloride together with a reaction product of TiCl$_4$ with an ether) (4 g) and hydrogen, followed by keeping the inside temperature at 70° C. Propylene was then fed into the vessel and a first stage polymerization was carried out at a pressure of 10 kg/cm$^2$, a temperature of 70° C. and a concentration of gas phase hydrogen of 5.5%. When the amount of propylene polymerized reached 3 kg, the propylene feed was stopped, followed by lowering the temperature down to room one, releasing hydrogen and unreacted propylene, withdrawing a portion of the resulting polymerization slurry, measuring $[\eta]_1$ and analyzing the Ti content in the polymer according to fluorescent X-ray method to determine the polymer yield per unit weight of catalyst. The temperature inside the vessel was then again raised up to 70° C. and propylene and hydrogen were fed and a second stage polymerization was carried out under a polymerization pressure of 10 kg/cm$^2$G while keeping the concentration of gas phase hydrogen at 0.2%. When the amount of propylene polymerized at the second stage reached 3 kg, the propylene feed was stopped, followed by lowering the temperature down to room one, relesing hydrogen and unreacted propylene, withdrawing a portion of the resulting polymerization slurry, measuring $[\eta]T$ and analyzing the Ti content in the polymer according to fluorescent X-ray method to determine the polymer yield per unit weight of catalyst and also determine the proportions of the respective amounts of propylene polymerized at the first stage and the second stage by the use of the value of the above-mentioned first stage polymer yield. Methanol (5 l) was added to the above-mentioned slurry after gas release, followed by stirring at 90° C. for 30 minutes, adding a 20% aqueous solution of NaOH (40 ml), further stirring for 20 minutes, cooling the mixture down to room temperature, adding water (5 l), three times repeating water-washing and water separation, filtering off the resulting slurry and drying to obtain a white polymer power. The analytical results of this polymer are shown in Table 1.

b. Production and evaluation of sheet:

To the white polymer powder (5 kg) obtained above in the item a. were added BHT (2, 6-di-t-butly-p-cresol) (5 g), Irganox 1010 (tetrakis [methylene (3, 5-di-t-butyl-4-hydroxy hydrocinnamate]methane) (2.5 g) and calcium stearate (10 g), followed by granulation. The resulting granulate was molded by an extrusion molding machine of 50 mm$\phi$ at 225° C. to obtain a sheet of 60 cm wide and 0.4 mm thick. In order to evaluate the heat vacuum formability of this sheet in a model manner, the sheet was fixed onto a frame of 40 cm×40 cm and placed in a temperature controlled chamber to measure the following physical properties: (i) sag amount of sheet (mm), (ii) maximum recovery amount (1/150×(150-sag amount at the time of maximum recovery)×100) and (iii) retention time since the time of maximum recovery till the time of reopening of sag. The results are shown in Table 1. Materials regarded as superior in the vacuum formability by these evaluation methods refer to those having a small sag amount, a large recovery amount and a long retention time.

EXAMPLE 2~4

Example 1 was repeated except that the respective hydrogen concentrations at the first stage and the second stage were varied to 5, 12 and 17% and 0.18, 0.15 and 0.08% in the order of the numbers of Examples. The results are shown in Table 1.

COMPARATIVE EXAMPLE 1

Example 1 was repeated except that the hydrogen concentration was varied to 1.3%, the polymer yield was varied to 6 kg and the second stage was omitted. The results are shown in Table 1.

COMPARATIVE EXAMPLES 2 and 3

Example 1 was repeated except that the repective hydrogen concentrations at the first stage and the second stage were varied to 3.5% and 27% and 0.4% and 0.04% in the order of the numbers of Comparative examples. The results are shown in Table 1.

TABLE 1

| Polymerization conditions and sheet processability (I) | | | | | | | |
|---|---|---|---|---|---|---|---|
| Physical properties of polymer and sheet | Example | | | | Comparative example | | |
| | 1 | 2 | 3 | 4 | 1 | 2 | 3 |
| (First stage) | | | | | | | |
| $\eta_1$ dl/g | 1.97 | 2.01 | 1.12 | 0.75 | 3.65 | 2.43 | 0.14 |
| Polymerization proportion wt. % | 42 | 54 | 48 | 55 | 100 | 52 | 53 |
| (Second stage) | | | | | | | |
| $\eta_2$ dl/g | 5.21 | 5.68 | 5.95 | 6.93 | — | 4.87 | 7.61 |
| Polymerization proportion wt. % | 58 | 46 | 52 | 45 | — | 48 | 47 |
| (Total polymer) | | | | | | | |
| MI g/10 min. | 0.28 | 0.37 | 0.43 | 0.52 | 0.42 | 0.45 | 0.42 |
| HMI g/10 min. | 9.4 | 13.5 | 17.5 | 22.0 | 8.9 | 11.2 | 19.1 |
| logHMI−0.922 logMI | 1.48 | 1.53 | 1.58 | 1.60 | 1.30 | 1.37 | 1.63 |
| $\eta_T$ dl/g | 3.85 | 3.70 | 3.63 | 3.53 | 3.65 | 3.60 | 3.65 |
| $\eta_H$−$\eta_L$ dl/g | 3.24 | 3.67 | 4.83 | 6.81 | — | 2.39 | 7.47 |
| (Sheet) | | | | | | | |
| Appearance Heating behavior | good | good | good | good | good | good | bad |
| Sag amount mm | 36 | 34 | 32 | 30 | 45 | 40 | 32 |
| Recovery amounts % | 80 | 84 | 86 | 92 | 68 | 72 | 93 |
| Retention time sec. | 22 | 24 | 23 | 19 | 8 | 11 | 21 |

As apparent from Comparative Examples 1 and 2 of the above Table, when the difference between the molecular weights of the respective polymer portions at the first stage and the second stage was nil or small, then logHMI−0.922 logMI<1.44 and the vacuum formability of polymer was inferior. On the other hand, as seen from Comparative example 3, when the difference between the $[\eta]$s of the respective polymer portions at the first stage and the second stage was too larg, the roughening of the sheet surface increased and although the vacuum formability was superior, the commodity value of the resulting molded products was lost due to the roughened surface. As a result, as described above, in order to impart a sufficient vacuum formability to the polymerrs of the present invention, it is preferred that $[\eta]_H-[\eta]_L \geqq 3.0$ and also in order to prevent roughening of the sheet surface, it is necessary that $[\eta]_H-[\eta]_L \leqq 6.5$.

COMPARATIVE EXAMPLES 4 AND 5

Example 1 was repeated except that the respective hydrogen concentrations at the first stage and the second stage were varied to 16% and 3.5% and 0.4% and 0.04% in the order of the numbers of Comparative examples and also the proportions of the respective amountes polymerized at the first stage and the second stage were varied to 1:3 and 3:1. The results are shown in Table 2. When the respective reaction proportions (amount polymerized) at the first stage and the second stage were unbalanced, logHMI−0.922 logMI<1.44 even if the difference between the respective molecular weights at the first stage and the second stage was made sufficient; thus the vacuum formability was insufficient and also the homogeneity as a molding material lowered, resulting in a sheet having an inferior appearance.

EXAMPLES 5 AND 6

Example 1 was repeated except that the respective hydrogen concentrations at the first stage and the second stage were varied to 4% and 13% and 0.05% and 0.16% in the order of the numbers of Examples. The results are shown in Table 2.

COMPARATIVE EXAMPLES 6 AND 7

Example 1 was repeated except that the respective hydrogen concentrations at the first stage and the second stage were vaired to 1.5% and 30% and 0.02% and 0.4% in the order of the numbers of Comparative Examples. The results are shown in Table 2. As seen from this Table, the polymer of Comparative example 6 was too low in the MI and inferior in the melt flow; hence a good sheet molding was impossible. Contrarily the polymer of Comparative example 7 was too high in the MI; hence when the sheet obtained by molding it was heated, the sag of the sheet remained as it was and the sheet did not returned to its original state.

EXAMPLE 7

Example 1 was repeated except that the respective hydrogen concentrations at the first stage and the second stage were varied to 0.08% and 6%. The results are shown in Table 2. As apparent from this Table, the higher molecular weight polymer portion may be prepared either at the first stage as in this Example 7 or at the second stage as in Example 1.

TABLE 2

Polymerization conditions and sheet processability (II)

| Physical properties of polymer and sheet | Example 5 | 6 | 7 | Comparative example 4 | 5 | 6 | 7 |
|---|---|---|---|---|---|---|---|
| (First stage) | | | | | | | |
| $\eta_1$ dl/g | 2.32 | 1.03 | 5.96 | 0.80 | 2.50 | 3.46 | 0.75 |
| Polymerization proportion wt. % | 51 | 53 | 54 | 24 | 79 | 56 | 47 |
| (Second stage) | | | | | | | |
| $\eta_2$ dl/g | 7.32 | 6.50 | 1.81 | 4.64 | 7.50 | 8.51 | 4.24 |
| Polymerization proportion wt. % | 49 | 47 | 46 | 76 | 21 | 44 | 53 |
| (Total polymer) | | | | | | | |
| MI g/10 min. | 0.05 | 0.70 | 0.20 | 0.36 | 0.48 | 0.01 | 3.0 |
| HMI g/10 min. | 2.6 | 31.0 | 9.6 | 9.0 | 11.5 | 0.56 | 7.9 |
| logHMI-0.922 logMI $\eta_T$ dl/g | 1.61 | 1.62 | 1.63 | 1.36 | 1.36 | 1.59 | 1.52 |
| | 4.77 | 3.60 | 4.05 | 3.72 | 3.55 | 5.05 | 2.60 |
| $\eta_H - \eta_L$ dl/g | 5.00 | 5.47 | 4.15 | 3.84 | 5.00 | 5.68 | 3.49 |
| (Sheet) | | | | | | | |
| Appearance | good | good | good | somewhat inferior | bad*[1] | | good |
| Heating behavior | | | | | | | |
| Sag amount mm | 26 | 38 | 28 | 41 | 43 | — | —*[2] |
| Recovery amount % | 94 | 80 | 91 | 73 | 72 | — | 0 |
| Retention times sec. | 32 | 16 | 28 | 14 | 9 | — | 0 |

Note
*[1] Flow is so inferior as to make it impossible to prepare a uniform sheet.
*[2] Sheet sags by heating and does not return to its original state.

EXAMPLE 8

The first stage polymerization was carried out as in Example 3. As to the second stage polymerization, initial propylene was fed at a temperature inside the vessel of 60° C. After the pressure inside the vessel reached 10 Kg/cm²G, propylene was changed to a mixed gas of 4% by weight of ethylene with 96% by weight of propylene and the hydrogen concentration was maintained at 0.25% under 10 Kg/cm²G at 60° C. When the amount polymerized reached 3 Kg, the feed of the mixed gas was stopped and the succeeding procedure was carried out as in Example 1. The results are shown in Table 3.

EXAMPLE 9

The first stage polymerization and the second stage (but as far as midway the stage) polymerization were carried out as in Example 3. Further the third stage polymerization was carried out. Namely when the amount of propylene fed at the second stage reached 2.2 Kg, the propylene feed was stopped, followed by releasing unreacted propylene, collecting a portion of polymerization slurry, measuring its intrinsic viscosity, etc. and analyzing the Ti content in the polymer to determine the polymer yield per unit weight of catalyst. The temperature inside the vessel was then raised up to 60° C. and an ethylene-propylene mixed gas containing 35% by weight of ethylene was fed at a rate of 690 g/hour for 2 hours. The gas phase hydrogen gas concentration inside the vessel was kept at 0.5%. After the mixed gas was fed in an amount of 1,380 g, unreacted gas inside the vessel was released and the succeeding procedure was carried out in the same manner as that after completion of the second stage of Example 1. The results are shown in Table 3. As apparent from this Table, the copolymers of Examples 8 and 9, too, had a good vacuum formability like the homopolymers of the present invention.

EXAMPLE 10

Example 8 was repeated except that the respective hydrogen concentrations at the first stage and the second stage were varied to 17% and 0.35%. The resulting polymer was granulated into pellets from which a 10 l bottle was prepared by blow molding in place of sheet molding. The bottle had a good appearance and a small unevenness of thickness. Namely the ratio of the thickness of the bottle at the uppermost part of the shell to that at the lowermost part of the shell was as good as 0.88. Other polymerization results are shown in Table 3.

COMPARATIVE EXAMPLES 8 AND 9

Polymerization and blow molding of the present invention were carried out as in Example 10 except that the respective hydrogen concentrations at the first stage and the second stage were varied to 2.25%, 3.5% and 0.15% in the order of the numbers of Comparative examples. As to the unevenness in thickness of the resulting bottles, the thickness ratio in Comparative example 8 was as inferior as 0.55 whereas that in Comparative example 9 was as good as 0.85. But the latter molded product had an inferior appearance. Other polymerization results are shown in Table 3.

TABLE 3

Polymerization conditions and processability

| Physical properties of polymer and sheet | Example 8 | 9 | 10 | Compar. ex. 8 | 9 |
|---|---|---|---|---|---|
| (First stage) | | | | | |
| $\eta_1$ dl/g | 1.06 | 1.14 | 0.79 | 3.10 | 0.35 |
| Polymerization proportion wt. % | 49 | 52 | 50 | 48 | 52 |
| (Second stage) | | | | | |
| $\eta_2$ dl/g | 6.57 | 6.10 | 5.84 | 3.35 | 7.50 |
| Polymerization proportion | 51 | 35 | 50 | 52 | 48 |

TABLE 3-continued

| Physical properties of polymer and sheet | Example | | | Compar. ex. | |
|---|---|---|---|---|---|
| | 8 | 9 | 10 | 8 | 9 |
| wt. % Ethylene content (Third stage) | 6.2 | — | 6.4 | 6.1 | 6.3 |
| $\eta_3$ dl/g | | 6.25 | | | |
| Polymerization proportion wt. % | | 13 | | | |
| Ethylene content wt. % | | 64 | | | |
| MI g/10 min. | 0.41 | 0.50 | 1.1 | 1.2 | 0.95 |
| HMI g/10 min. | 19.5 | 21.5 | 42 | 23 | 38 |
| logHMI-0.922 logMI | 1.65 | 1.61 | 1.62 | 1.37 | 1.58 |
| $\eta_T$ dl/g | 3.65 | 3.54 | 3.32 | 3.25 | 3.61 |
| *$\eta_H - \eta_L$ dl/g | 5.51 | 5.00 | 5.05 | 0.25 | 7.15 |
| Ethylene content wt. % (Sheet) | 3.2 | 8.3 | 3.2 | 3.0 | 3.2 |
| Appearance | good | good | | | |
| Heating behavior | | | | | |
| Sag amount mm | 29 | 31 | | | |
| Recovery amount % | 94 | 91 | | | |
| Retention time sec. | 25 | 24 | | | |

Note
*The weighted average of the intrinsic viscosities were made $[\eta]_H$.

What is claimed is:

1. A polypropylene for post-processed sheets and for blow molding which is characterized in that
   (1) said polypropylene is obtained by polymerizing propylene at multiple stages by the use of a catalyst comprising a titanium trichloride composition and an organoaluminum compound and a molecular weight modifier;
   (2) the resulting final polymer comprising a higher molecular weight portion and a lower molecular weight portion has a melt flow index (MI) of 0.03 to 2.0 g/10 minutes, and between this melt flow index and a melt flow index (HMI) (10.2 kg/10 minutes, 230° C.) as measured under 5 times the load applied in the measurement of the former melt flow index, there is a relationship $$\log \text{HMI} \geq 0.922 \log \text{MI} + 1.44 \quad (1); \text{ and}$$

(3) said final polymer consists of 40 to 60% by weight of a polypropylene portion corresponding to said higher molecular weight portion and 60 to 40% by weight of a polypropylene portion corresponding to said lower molecular weight portion, the intrinsic viscosity of the higher molecular weight portion, $[\eta]_H$, and that of the lower molecular weight portion $N_L$, having the relationship: $3.0 \leq [\eta]_H - [\eta]_L \leq 6.5$.

2. A polypropylene according to claim 1 wherein propylene is copolymerized with ethylene at at least one of said multiple stages and the ethylene content in said final polymer is in the range of 1 to 15% by weight.

3. A process for producing a polypropylene for post-processed sheets and for blow molding which is characterized in that
   propylene is polymerized at multiple stages by the use of a catalyst comprising a titanium trichloride composition and an organoaluminum compound and a molecular weight modifier,
   to obtain a final polymer comprising a higher molecular weight portion and a lower molecular weight portion, this final polymer having a melt flow index (MI) of 0.03 to 2.0 g/10 minutes, and between this melt flow index and a melt flow index (HMI) (10.2 kg/10 minutes, 230° C.) as measured under 5 times the load applied in the measurement of the former melt flow index, there being a relationship $$\log \text{HMI} \geq 0.922 \log \text{MI} + 1.44 \quad (1), \text{ and}$$

said final polymer consisting of 40 to 60% by weight of a polypropylene portion corresponding to said higher molecular weight portion and 60 to 40% by weight of a polypropylene portion corresponding to said lower molecular portion, the intrinsic viscosity of the higher molecular weight portion, $[\eta]_H$, and that of the lower molecular weight portion $N_L$, having the relationship: $3.0 \leq [\eta]_H - [\eta]_L \leq 6.5$.

4. A process for producing a polypropylene according to claim 3 wherein propylene is copolymerized with ethylene at at least one of said multiple stages and the ethylene content in said final polymer is in the range of 1 to 15% by weight.

* * * * *